United States Patent
Xue et al.

(10) Patent No.: US 11,723,112 B2
(45) Date of Patent: Aug. 8, 2023

(54) POWER SAVING METHODS AND DEVICES USING DISCONTINUOUS RECEPTION (DRX) IN WIRELESS SYSTEMS

(71) Applicant: Huawei Technologies Co., Ltd., Shenzhen (CN)

(72) Inventors: Yifan Xue, Beijing (CN); Yu Cai, Beijing (CN); Xiaocui Li, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 240 days.

(21) Appl. No.: 17/267,216

(22) PCT Filed: Aug. 16, 2019

(86) PCT No.: PCT/CN2019/101003
§ 371 (c)(1),
(2) Date: Feb. 9, 2021

(87) PCT Pub. No.: WO2020/035053
PCT Pub. Date: Feb. 20, 2020

(65) Prior Publication Data
US 2021/0315046 A1    Oct. 7, 2021

(30) Foreign Application Priority Data
Aug. 17, 2018    (CN) .......................... 201810942575.3

(51) Int. Cl.
*H04W 76/28*    (2018.01)
*H04W 72/04*    (2023.01)

(52) U.S. Cl.
CPC ........... *H04W 76/28* (2018.02); *H04W 72/04* (2013.01)

(58) Field of Classification Search
CPC ............... H04W 76/28; H04W 72/042; H04W 72/0446; H04W 72/1289; H04W 28/20;
(Continued)

(56) References Cited

U.S. PATENT DOCUMENTS

| 2018/0176937 A1 | 6/2018 | Chen et al. |
| 2018/0220345 A1 | 8/2018 | Moon et al. |

(Continued)

FOREIGN PATENT DOCUMENTS

| CN | 108024319 A | 5/2018 |
| CN | 108207032 A | 6/2018 |

(Continued)

OTHER PUBLICATIONS

U.S. Appl. No. 62/564,650, (filed 2017).*
(Continued)

*Primary Examiner* — Rushil Parimal Sampat
(74) *Attorney, Agent, or Firm* — Conley Rose, P.C.

(57) ABSTRACT

A configuration method includes receiving, by a terminal device, configuration information from a network device, where the configuration information includes a first discontinuous reception (DRX) parameter and a second DRX parameter, and communicating, by the terminal device, with the network device on a first bandwidth part (BWP) using the first DRX parameter or on a second BWP using the second DRX parameter.

20 Claims, 4 Drawing Sheets

(58) Field of Classification Search
CPC ............. H04W 48/12; H04W 52/0216; H04W 72/0453; H04W 72/04; Y02D 30/70; H04L 27/2607; H04L 5/0007
See application file for complete search history.

(56) References Cited

U.S. PATENT DOCUMENTS

| | | | |
|---|---|---|---|
| 2019/0053159 A1* | 2/2019 | Wei | H04W 52/0216 |
| 2019/0098689 A1* | 3/2019 | Wei | H04W 72/1289 |
| 2019/0357141 A1 | 11/2019 | Zhao et al. | |
| 2020/0053649 A1 | 2/2020 | Yao et al. | |
| 2020/0120678 A1 | 4/2020 | Zhou | |
| 2020/0145882 A1* | 5/2020 | Zhang | H04L 27/2607 |
| 2021/0345443 A1* | 11/2021 | Li | H04W 76/28 |

FOREIGN PATENT DOCUMENTS

| | | |
|---|---|---|
| CN | 108370577 A | 8/2018 |
| WO | 2018085145 A1 | 5/2018 |
| WO | 2018086600 A1 | 5/2018 |
| WO | 2018127218 A1 | 7/2018 |

OTHER PUBLICATIONS

WO 2018/223369 A1 (Year: 2017).*
R2-1811068, R2-181xxxx OPPO,"DRX operation for NR-U," 3GPP TSG-RAN WG2 Meeting #103 ,Gothenberg, Sweden, Aug. 20-24, 2018, 2 pages.
R2-1706474, update to R2-1705206, Huawei et al, "DRX configuration in NR," 3GPP TSG-RAN WG2 NR Adhoc, Qingdao, China, Jun. 27-30, 2017, 6 pages.
R2-1702605, Huawei et al., "DRX with Multiple Numerologies," 3GPP TSG-RAN2 Meeting#97bis, Spokane, Washington, USA, Apr. 3-7, 2017, 4 pages.
R2-1707073, VIVO, "Discussion on NR DRX configuration in RRC_CONNECTED state," 3GPP TSG-RAN WG2 NR Ad Hoc,Qingdao, China, Jun. 27-29, 2017, 3 pages.
R2-1704944 , MediaTek Inc., "DAX configuration for NR," 3GPP TSG-RAN WG2#98, Hangzhou, China, May 15-19, 2017, R2-1704944, 4 pages.
R2-1706683, (Revision of R2-1704913) InterDigital Inc., "C-DRX with Multiple Configurations," 3GPP TSG-RAN WG2 NR AH#2, Qingdao, P.R. China, Jun. 27-29, 2017, 6 pages.

* cited by examiner

POWER SAVING METHODS AND DEVICES USING DISCONTINUOUS RECEPTION (DRX) IN WIRELESS SYSTEMS

CROSS-REFERENCE TO RELATED APPLICATIONS

This application is a U.S. National Stage of International Patent Application No. PCT/CN2019/101003 filed on Aug. 16, 2019, which claims priority to Chinese Patent Application No. 201810942575.3 filed on Aug. 17, 2018, both of which are hereby incorporated by reference in their entireties.

TECHNICAL FIELD

Embodiments of this application relate to the communications field, and in particular, to a configuration method and a device.

BACKGROUND

A bandwidth part (bandwidth part, BWP) is supported in 5G new radio (new radio, NR). To be specific, a part of bandwidth of system bandwidth is occupied for transmission between a network device and user equipment (user equipment, UE). Specifically, a BWP with relatively high bandwidth may be configured for the UE, and the UE may communicate with the network device on the BWP. If the UE does not receive, within a period of time (for example, when a BWP timer expires), a downlink signal for scheduling the UE, the UE switches from the currently configured BWP with the relatively high bandwidth to a relatively small BWP (which may be referred to as a default BWP), to reduce power consumption of the UE.

In addition, to reduce the power consumption of the UE, a discontinuous reception (discontinuous reception, DRX) function may be further configured for the UE, so that the UE monitors a physical downlink control channel (physical downlink control channel. PDCCH) only in a period of time within a DRX cycle, and does not monitor the PDCCH in other time within the DRX cycle.

In the conventional technology, when the UE communicates with the network device on different BWPs, DRX parameters configured for the UE are the same, and it is difficult to adapt to features of services on the different BWPs.

SUMMARY

Embodiments of this application provide a configuration method and a device, so that DRX can be flexibly configured based on different BWPs, thereby better matching a service feature, and improving communication quality.

To achieve the foregoing objective, the following technical solutions are used in the embodiments of this application.

According to a first aspect, a configuration method is disclosed, and includes: A terminal device receives configuration information sent by a network device, where the configuration information includes a first DRX parameter and a second DRX parameter, and the DRX parameter may be used to configure a discontinuous reception function. Further, the terminal device may communicate with the network device on a first BWP by using the first DRX parameter, or the terminal device communicates with the network device on a second BWP by using the second DRX parameter.

An embodiment of the present invention provides a configuration method. A terminal device first receives configuration information sent by a network device, where the configuration information includes a first DRX parameter and a second DRX parameter, and the first DRX parameter and the second DRX parameter are different configuration parameters. Further, the terminal device may communicate with the network device on a first BWP by using the first DRX parameter, or the terminal device may communicate with the network device on a second BWP by using the second DRX parameter. Different services may be carried on different BWPs. It may be learned that, in this embodiment of the present invention, different DRX parameters may be configured for the different services, so that requirements of the different services can be further met, service features can be better matched, and communication quality can be improved. In addition, in the method provided in this embodiment of the present invention, different DRX parameters can be configured for the different BWPs, in other words, the DRX parameters can be flexibly configured. For example, a dormant period in a DRX cycle is less than valid duration of a BWP timer, but is not excessively small. Therefore, not only power consumption of UE can be reduced, but the UE can also be prevented from frequently switching BWPs.

With reference to the first aspect, in a first possible implementation of the first aspect, the configuration information includes a configuration parameter of the first BWP and a configuration parameter of the second BWP, the configuration parameter of the first BWP includes the first DRX parameter, and the configuration parameter of the second BWP includes the second DRX parameter.

In this embodiment of the present invention, the configuration information may be BWP configuration information. By adding a DRX parameter to the information to associate a BWP and the DRX parameter, the terminal device may determine, based on the BWP configuration information, the BWP and the DRX parameter used when the BWP works, so that different DRX parameters can be configured for different BWPs to meet different service features.

With reference to the first possible implementation of the first aspect, in a second possible implementation of the first aspect, before the terminal device communicates with the network device on the first BWP by using the first DRX parameter, the method further includes: The terminal device obtains the configuration parameter of the first BWP from the configuration information, and obtains the first DRX parameter from the configuration parameter of the first BWP; or before the terminal device communicates with the network device on the second BWP by using the second DRX parameter, the method further includes: The terminal device obtains the configuration parameter of the second BWP from the configuration information, and obtains the second DRX parameter from the configuration parameter of the second BWP.

In this embodiment of the present invention, in a solution of configuring the DRX parameter by using the BWP configuration information, the terminal device may obtain the configuration information delivered by the network device, obtain a BWP configuration parameter from the configuration information, determine a BWP on which the terminal device works, and may further obtain the DRX parameter from the BWP configuration parameter, and configure a discontinuous reception state when the terminal device works on the BWP.

With reference to the first aspect, in a third possible implementation of the first aspect, the first DRX parameter includes at least one BWP identifier, and the second DRX parameter includes at least one BWP identifier.

In this embodiment of the present invention, the configuration information may be DRX configuration information. By adding a BWP identifier to the information to associate a BWP and a DRX parameter, the terminal device may determine a group of DRX parameters based on the DRX configuration information, and determine, based on the BWP identifier in the information, a BWP on which the terminal device works when using the group of DRX parameters, so that different DRX parameters can be configured for different BWPs to meet different service features.

With reference to the third possible implementation of the first aspect, in a fourth possible implementation of the first aspect, before the terminal device communicates with the network device on the first BWP by using the first DRX parameter, the method further includes: The terminal device obtains the first DRX parameter from the configuration information, obtains one BWP identifier from the first DRX parameter, and determines, as the first BWP, a BWP indicated by the BWP identifier; or before the terminal device communicates with the network device on the second BWP by using the second DRX parameter, the method further includes: The terminal device obtains the second DRX parameter from the configuration information, obtains one BWP identifier from the second DRX parameter, and determines, as the second BWP, a BWP indicated by the BWP identifier.

In this embodiment of the present invention, in a solution of configuring a BWP by using the DRX configuration information, the terminal device may obtain the configuration information delivered by the network device, obtain a DRX parameter and a BWP identifier from the configuration information, and determine, based on the BWP identifier, a BWP on which the terminal device works, and may further configure a discontinuous reception state based on the obtained DRX parameter when working on the BWP.

With reference to the first aspect, in a fifth possible implementation of the first aspect, the configuration information includes a configuration parameter of the first BWP and a configuration parameter of the second BWP, the configuration parameter of the first BWP includes at least one DRX parameter identifier, and the configuration parameter of the second BWP includes at least one DRX parameter identifier.

In this embodiment of the present invention, the configuration information may be BWP configuration information. By adding a DRX parameter identifier to the information to associate a BWP and a DRX parameter, the terminal device may determine, based on the BWP configuration information, a BWP on which the terminal device works, and determine a group of DRX parameters based on the DRX parameter identifier. When the terminal device works on the BWP, a discontinuous reception state is configured by using the group of DRX parameters. It may be learned that, in this embodiment of the present invention, different DRX parameters can be configured for different BWPs to meet different service features.

With reference to the fifth possible implementation of the first aspect, in a sixth possible implementation of the first aspect, before the terminal device communicates with the network device on the first bandwidth part BWP by using the first DRX parameter, the method further includes: The terminal device obtains the configuration parameter of the first BWP from the configuration information, obtains one DRX parameter identifier from the configuration parameter of the first BWP, and determines, as the first DRX parameter, a DRX parameter indicated by the DRX parameter identifier; or before the terminal device communicates with the network device on the second BWP by using the second DRX parameter, the method further includes: The terminal device obtains the configuration parameter of the second BWP from the configuration information, obtains one DRX parameter identifier from the configuration parameter of the second BWP, and determines, as the second DRX parameter, a DRX parameter indicated by the DRX parameter identifier.

In this embodiment of the present invention, in a solution of configuring a DRX parameter by using the BWP configuration information, the terminal device may obtain the configuration information delivered by the network device, obtain a BWP configuration parameter and a DRX parameter identifier from the configuration information, and determine, based on a BWP identifier, a BWP on which the terminal device works, and may further configure a discontinuous reception state based on the obtained DRX parameter when working on the BWP.

With reference to the first aspect, in a seventh possible implementation of the first aspect, the first DRX parameter includes at least one piece of type information, the second DRX parameter includes at least one piece of type information, the type information is used to indicate a first type of BWP or a second type of BWP, and the first type of BWP is different from the second type of BWP.

In this embodiment of the present invention, the configuration information may be DRX configuration information. By adding, to the information, type information indicating a BWP type, to associate a BWP and a DRX parameter, the terminal device may determine a group of DRX parameters based on the DRX configuration information, and determine, based on the type information in the information, a BWP on which the terminal device works when using the group of DRX parameters, so that different DRX parameters can be configured for different BWPs to meet different service features.

With reference to the seventh possible implementation of the first aspect, in an eighth possible implementation of the first aspect, before the terminal device communicates with the network device on the first bandwidth part BWP by using the first DRX parameter, the method further includes: The terminal device obtains the first DRX parameter from the configuration information, obtains one piece of type information from the first DRX parameter, and determines, as the first BWP, a BWP indicated by the type information; or before the terminal device communicates with the network device on the second BWP by using the second DRX parameter, the method further includes: The terminal device obtains the second DRX parameter from the configuration information, obtains one piece of type information from the second DRX parameter, and determines, as the second BWP, a BWP indicated by the type information.

In this embodiment of the present invention, in a solution of configuring a BWP by using the DRX configuration information, the terminal device may obtain the configuration information delivered by the network device, obtain a DRX parameter and BWP type information from the configuration information, and determine, based on the BWP type information, a BWP on which the terminal device works, and may further configure a discontinuous reception state based on the obtained DRX parameter when working on the BWP.

According to a second aspect, a configuration method is disclosed, and includes: A network device generates configuration information, where the configuration information includes a first discontinuous reception DRX parameter and a second DRX parameter; and the network device sends the configuration information to a terminal device, so that the terminal device communicates with the network device on a first bandwidth part BWP by using the first DRX parameter, or communicates with the network device on a second BWP by using the second DRX parameter.

An embodiment of the present invention provides a configuration method. A network device first delivers configuration information to a terminal device, where the configuration information includes a first DRX parameter and a second DRX parameter, and the first DRX parameter and the second DRX parameter are different configuration parameters. Further, after receiving the configuration information, the terminal device may communicate with the network device on a first BWP by using the first DRX parameter, or the terminal device may communicate with the network device on a second BWP by using the second DRX parameter. Different services may be carried on different BWPs. It may be learned that, in this embodiment of the present invention, different DRX parameters may be configured for the different services, so that requirements of the different services can be further met, service features can be better matched, and communication quality can be improved. In addition, in the method provided in this embodiment of the present invention, different DRX parameters can be configured for the different BWPs, in other words, the DRX parameters can be flexibly configured. For example, a dormant period in a DRX cycle is less than valid duration of a BWP timer, but is not excessively small. Therefore, not only power consumption of UE can be reduced, but the UE can also be prevented from frequently switching BWPs.

With reference to the second aspect, in a first possible implementation of the second aspect, the configuration information includes a configuration parameter of the first BWP and a configuration parameter of the second BWP, the configuration parameter of the first BWP includes the first DRX parameter, and the configuration parameter of the second BWP includes the second DRX parameter.

With reference to the second aspect, in a second possible implementation of the second aspect, the first DRX parameter includes at least one BWP identifier, and the second DRX parameter includes at least one BWP identifier.

With reference to the second aspect, in a third possible implementation of the second aspect, the configuration information includes a configuration parameter of the first BWP and a configuration parameter of the second BWP, the configuration parameter of the first BWP includes at least one DRX parameter identifier, and the configuration parameter of the second BWP includes at least one DRX parameter identifier.

With reference to the second aspect, in a fourth possible implementation of the second aspect, the first DRX parameter includes at least one piece of type information, the second DRX parameter includes at least one piece of type information, the type information is used to indicate a first type of BWP or a second type of BWP, and the first type of BWP is different from the second type of BWP.

According to a third aspect, a terminal device is disclosed, and includes: a receiving unit, configured to receive configuration information sent by a network device, where the configuration information includes a first DRX parameter and a second DRX parameter, and the DRX parameter may be used to configure a discontinuous reception function; and a processing unit, configured to communicate with the network device on a first BWP by using the first DRX parameter, or the terminal device communicates with the network device on a second BWP by using the second DRX parameter.

With reference to the third aspect, in a first possible implementation of the third aspect, the configuration information includes a configuration parameter of the first BWP and a configuration parameter of the second BWP, the configuration parameter of the first BWP includes the first DRX parameter, and the configuration parameter of the second BWP includes the second DRX parameter.

With reference to the first possible implementation of the third aspect, in a second possible implementation of the third aspect, the processing unit is further configured to: before the terminal device communicates with the network device on the first BWP by using the first DRX parameter, obtain the configuration parameter of the first BWP from the configuration information, and obtain the first DRX parameter from the configuration parameter of the first BWP; or before the terminal device communicates with the network device on the second BWP by using the second DRX parameter, obtain the configuration parameter of the second BWP from the configuration information, and obtain the second DRX parameter from the configuration parameter of the second BWP.

With reference to the third aspect, in a third possible implementation of the third aspect, the first DRX parameter includes at least one BWP identifier, and the second DRX parameter includes at least one BWP identifier.

With reference to the third possible implementation of the third aspect, in a fourth possible implementation of the third aspect, the processing unit is further configured to: before the terminal device communicates with the network device on the first BWP by using the first DRX parameter, obtain the first DRX parameter from the configuration information, obtain one BWP identifier from the first DRX parameter, and determine, as the first BWP, a BWP indicated by the BWP identifier; or before the terminal device communicates with the network device on the second BWP by using the second DRX parameter, obtain the second DRX parameter from the configuration information, obtain one BWP identifier from the second DRX parameter, and determine, as the second BWP, a BWP indicated by the BWP identifier.

With reference to the third aspect, in a fifth possible implementation of the third aspect, the configuration information includes a configuration parameter of the first BWP and a configuration parameter of the second BWP, the configuration parameter of the first BWP includes at least one DRX parameter identifier, and the configuration parameter of the second BWP includes at least one DRX parameter identifier.

With reference to the fifth possible implementation of the third aspect, in a sixth possible implementation of the third aspect, the processing unit is further configured to: before the terminal device communicates with the network device on the first bandwidth part BWP by using the first DRX parameter, obtain the configuration parameter of the first BWP from the configuration information, obtain one DRX parameter identifier from the configuration parameter of the first BWP, and determine, as the first DRX parameter, a DRX parameter indicated by the DRX parameter identifier; or before the terminal device communicates with the network device on the second BWP by using the second DRX parameter, obtain the configuration parameter of the second BWP from the configuration information, obtain one DRX parameter identifier from the configuration parameter of the second BWP, and determine, as the second DRX parameter, a DRX parameter indicated by the DRX parameter identifier.

With reference to the third aspect, in a seventh possible implementation of the third aspect, the first DRX parameter includes at least one piece of type information, the second DRX parameter includes at least one piece of type information, the type information is used to indicate a first type of BWP or a second type of BWP, and the first type of BWP is different from the second type of BWP.

With reference to the seventh possible implementation of the third aspect, in an eighth possible implementation of the third aspect, the processing unit is further configured to: before the terminal device communicates with the network device on the first bandwidth part BWP by using the first DRX parameter, obtain the first DRX parameter from the configuration information, obtain one piece of type information from the first DRX parameter, and determine, as the first BWP, a BWP indicated by the type information; or before the terminal device communicates with the network device on the second BWP by using the second DRX parameter, obtain the second DRX parameter from the configuration information, obtain one piece of type information from the second DRX parameter, and determine, as the second BWP, a BWP indicated by the type information.

According to a fourth aspect, a network device is disclosed, and includes: a processing unit, configured to generate configuration information, where the configuration information includes a first discontinuous reception DRX parameter and a second DRX parameter; and a sending unit, configured to send the configuration information to a terminal device, so that the terminal device communicates with the network device on a first bandwidth part BWP by using the first DRX parameter, or communicates with the network device on a second BWP by using the second DRX parameter.

With reference to the fourth aspect, in a first possible implementation of the fourth aspect, the configuration information includes a configuration parameter of the first BWP and a configuration parameter of the second BWP, the configuration parameter of the first BWP includes the first DRX parameter, and the configuration parameter of the second BWP includes the second DRX parameter.

With reference to the fourth aspect, in a second possible implementation of the fourth aspect, the first DRX parameter includes at least one BWP identifier, and the second DRX parameter includes at least one BWP identifier.

With reference to the fourth aspect, in a third possible implementation of the fourth aspect, the configuration information includes a configuration parameter of the first BWP and a configuration parameter of the second BWP, the configuration parameter of the first BWP includes at least one DRX parameter identifier, and the configuration parameter of the second BWP includes at least one DRX parameter identifier.

With reference to the fourth aspect, in a fourth possible implementation of the fourth aspect, the first DRX parameter includes at least one piece of type information, the second DRX parameter includes at least one piece of type information, the type information is used to indicate a first type of BWP or a second type of BWP, and the first type of BWP is different from the second type of BWP.

According to a fifth aspect, a terminal device is disclosed, and includes one or more processors and one or more memories. The one or more memories are coupled to the one or more processors, the one or more memories are configured to store computer program code, and the computer program code includes a computer instruction. When the one or more processors execute the computer instruction, the terminal device is enabled to perform the configuration method according to the first aspect, any implementation of the first aspect, the second aspect, or any implementation of the second aspect.

According to a sixth aspect, a network device is disclosed, and includes one or more processors and one or more memories. The one or more memories are coupled to the one or more processors, the one or more memories are configured to store computer program code, and the computer program code includes a computer instruction. When the one or more processors execute the computer instruction, the network device is enabled to perform the configuration method according to the first aspect, any implementation of the first aspect, the second aspect, or any implementation of the second aspect.

According to a seventh aspect, a computer-readable storage medium is disclosed. The computer-readable storage medium stores an instruction. When the computer-readable storage medium runs on the terminal device according to the third aspect, any implementation of the third aspect, the fifth aspect, or any implementation of the fifth aspect, the terminal device is enabled to perform the configuration method according to the first aspect, any implementation of the first aspect, the second aspect, or any implementation of the second aspect.

According to an eighth aspect, a computer-readable storage medium is disclosed. The computer-readable storage medium stores an instruction. When the computer-readable storage medium runs on the network device according to the fourth aspect, any implementation of the fourth aspect, the sixth aspect, or any implementation of the sixth aspect, the network device is enabled to perform the configuration method according to the first aspect, any implementation of the first aspect, the second aspect, or any implementation of the second aspect.

According to a ninth aspect, a wireless communication apparatus is disclosed. The wireless communication apparatus stores an instruction. When the wireless communication apparatus runs on the terminal device according to the third aspect, any implementation of the third aspect, the fifth aspect, or any implementation of the fifth aspect, the terminal device is enabled to perform the configuration method according to the first aspect, any implementation of the first aspect, the second aspect, or any implementation of the second aspect. The wireless communication apparatus is a chip.

According to a tenth aspect, a wireless communication apparatus is disclosed. The wireless communication apparatus stores an instruction. When the wireless communication apparatus runs on the network device according to the fourth aspect, any implementation of the fourth aspect, the sixth aspect, or any implementation of the sixth aspect, the network device is enabled to perform the configuration method according to the first aspect, any implementation of the first aspect, the second aspect, or any implementation of the second aspect. The wireless communication apparatus is a chip.

DESCRIPTION OF EMBODIMENTS

Figure 1:
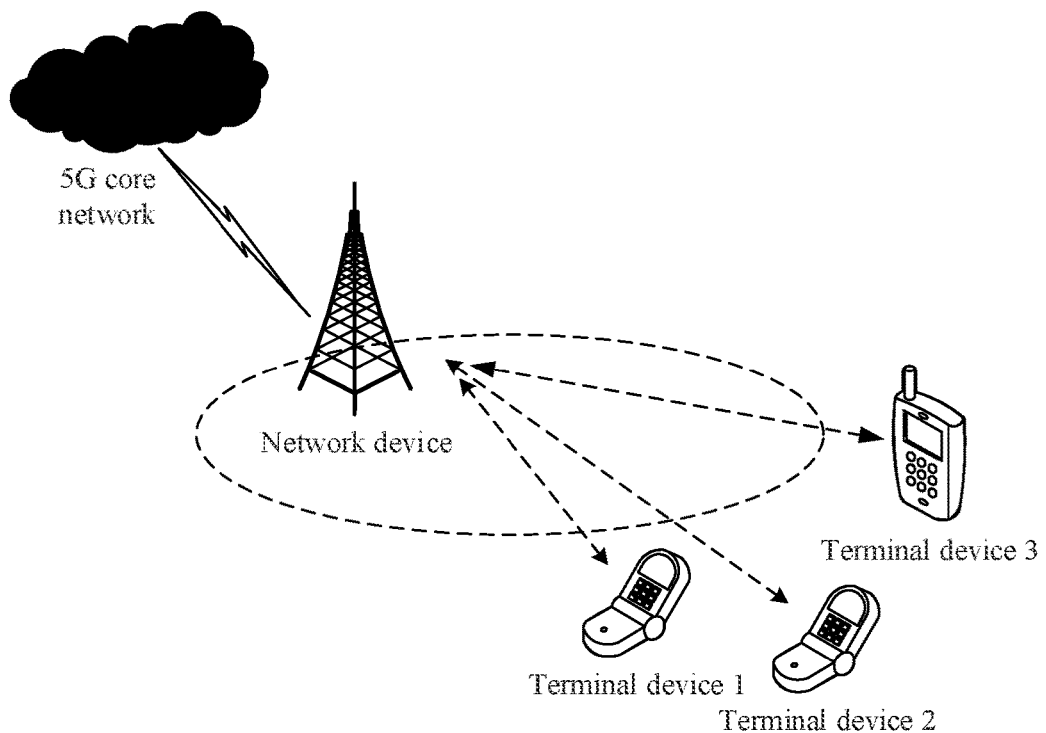
FIG. 1 is an architectural diagram of a communications network according to an embodiment of the present invention.

FIG. 1 is an architectural diagram of a communications network according to an embodiment of the present invention. A network device is connected to a core network, a terminal device may access the core network by using the network device, and the network device may schedule the terminal device to receive downlink data or send uplink data. The network device may be a base station, and the terminal device may be UE, for example, a personal device such as a mobile phone, an iPad, or a personal computer (personal computer, PC).

In a 5G system, system bandwidth is relatively high. For example, in a carrier aggregation (carrier aggregation, CA) or dual connectivity (dual connectivity, DC) scenario, bandwidth of each carrier component (carrier component, CC) may be very high, and reach 200 MHz or 400 MHz. Some UEs cannot support such high bandwidth. The network device may configure a BWP (in other words, a part of system bandwidth) for the UE, for example, 20 MHz. The UE may communicate with the network device on the 20 MHz bandwidth configured by the network device.

It should be noted that the UE needs to monitor a physical downlink control channel (physical downlink control channel, PDCCH). Higher BWP bandwidth indicates a larger range that needs to be monitored by the UE, and larger power consumption. To reduce the power consumption of the UE, BWP fallback (fallback) is introduced in an NR standard. Specifically, when UE works on a currently activated BWP, if a downlink signal (including a signal for scheduling the UE to receive downlink data and a signal for scheduling the UE to send uplink data) to be used by the network device to schedule the UE is not received within a period of time (for example, when a BWP timer expires), the UE considers that a probability of being scheduled by the network device is relatively low, and switches (switch) from the currently activated BWP to a BWP with relatively low bandwidth, to reduce power consumption. In this embodiment of the present invention, the BWP with relatively low bandwidth may be referred to as a default BWP (default BWP).

Figure 2:
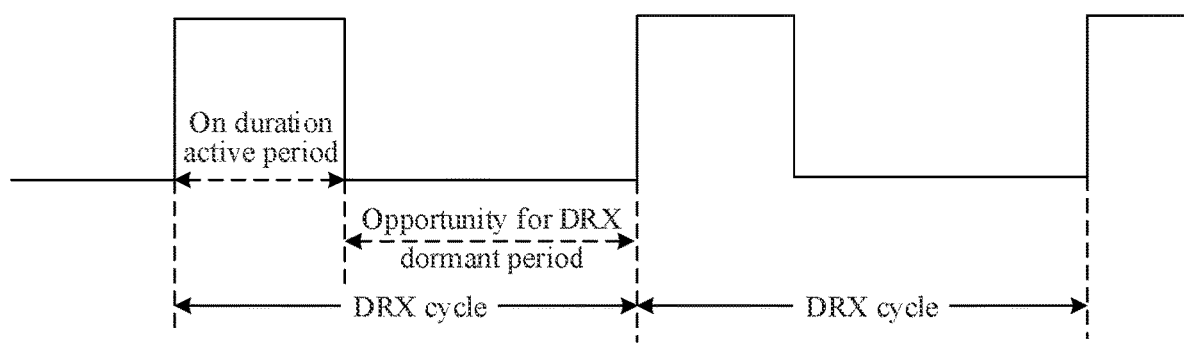
FIG. 2 is a schematic diagram of a DRX cycle in the conventional technology.

In addition, C-DRX (connected discontinuous reception, connected discontinuous reception) is further defined in NR to further reduce power consumption caused when the UE monitors the PDCCH. A basic principle of the C-DRX is that the network device configures a C-DRX parameter for UE in a connected mode, and the C-DRX parameter may indicate a C-DRX cycle (cycle). As shown in FIG. 2, the C-DRX cycle includes "on duration" and "opportunity for DRX", where "on duration" may be referred to as an active period, and "opportunity for DRX" may be referred to as a dormant period. Within "on duration", the UE monitors and receives the PDCCH. Within time of "opportunity for DRX", the UE does not receive the PDCCH, to reduce power consumption.

Currently, the network device configures the C-DRX parameter by using the UE as a granularity. When different BWPs are configured for the UE, the UE determines behavior of the UE only based on this set of C-DRX parameters configured by the network device. However, BWPs with different bandwidth usually correspond to different services, and features such as throughputs and delay requirements of different services are different. It can be learned that when the UE communicates with the network device on different BWPs, DRX parameters configured for the UE are the same, and it is difficult to adapt to features of services on the different BWPs.

In addition, when the C-DRX is configured for the UE, if "on duration" of the UE is longer than valid duration of the BWP timer, the UE inevitably switches to the default BWP. When data transmitted between the UE and the network device is relatively large, the UE needs to switch to a relatively large BWP again. Consequently, the UE frequently switches BWPs, and a transmission delay between the UE and the network device is greatly increased. To avoid occurrence of this case, the dormant period in the DRX cycle may be configured to be relatively short. However, in this case, dormant time of the UE is too short to meet a requirement of reducing power consumption.

An embodiment of the present invention provides a configuration method. A terminal device first receives configuration information sent by a network device, where the configuration information includes a first DRX parameter and a second DRX parameter, and the first DRX parameter and the second DRX parameter are different configuration parameters. Further, the terminal device may communicate with the network device on a first BWP by using the first DRX parameter, or the terminal device may communicate with the network device on a second BWP by using the second DRX parameter. Different services may be carried on different BWPs. It may be learned that, in this embodiment of the present invention, different DRX parameters may be configured for the different services, so that requirements of the different services can be further met, service features can be better matched, and communication quality can be improved. In addition, in the method provided in this embodiment of the present invention, different DRX parameters can be configured for the different BWPs, in other words, the DRX parameters can be flexibly configured. For example, a dormant period in a DRX cycle is less than valid duration of a BWP timer, but is not excessively small. Therefore, not only power consumption of UE can be reduced, but the UE can also be prevented from frequently switching BWPs.

Figure 3:
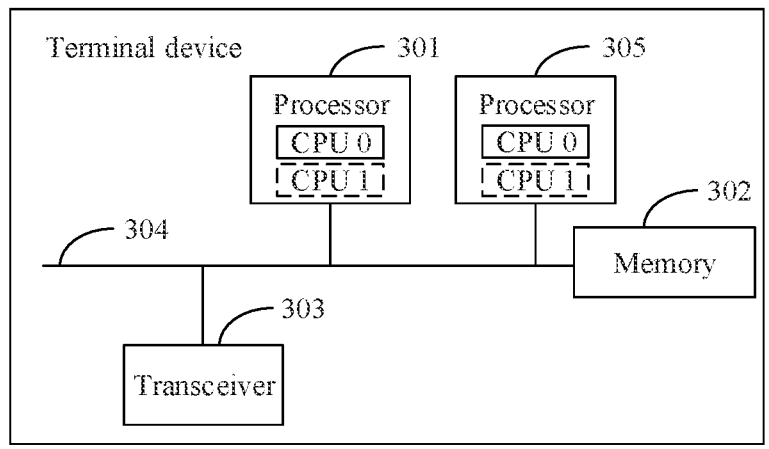
FIG. 3 is a structural block diagram of a terminal device according to an embodiment of the present invention.

An embodiment of the present invention provides a terminal device 30. The configuration method provided in the embodiments of the present invention may be used in the terminal device shown in FIG. 3. As shown in FIG. 3, the terminal device may include at least one processor 301, a memory 302, a transceiver 303, and a communications bus 304.

Each constituent part of the terminal device is specifically described below with reference to FIG. 3.

The processor 301 is a control center of the terminal device, and may be one processor, or may be a general name of a plurality of processing elements. For example, the processor 301 may be a central processing unit (central processing unit, CPU), or an application-specific integrated circuit (Application Specific Integrated Circuit, ASIC), or may be configured as one or more integrated circuits implementing this embodiment of the present invention, for example, one or more microprocessors (digital signal processor, DSP) or one or more field programmable gate arrays (Field Programmable Gate Array, FPGA).

The processor 301 may perform various functions of the terminal device by running or executing a software program stored in the memory 302 and invoking data stored in the memory 302.

In specific implementation, in an embodiment, the processor 301 may include one or more CPUs, for example, a CPU 0 and a CPU 1 shown in FIG. 3.

During specific implementation, in an embodiment, the terminal device may include a plurality of processors, for example, the processor 301 and a processor 305 shown in FIG. 3. Each of these processors may be a single-core processor (single-CPU), or may be a multi-core processor (multi-CPU). The processor herein may be one or more terminal devices, circuits, and/or processing cores used for processing data (for example, a computer program instruction).

The memory 302 may be a read-only memory (read-only memory, ROM) or another type of static storage terminal device that can store static information and an instruction, a random access memory (random access memory, RAM) or another type of dynamic storage terminal device that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another optical disc storage, an optical disc storage (including a compressed optical disc, a laser disc, an optical disc, a digital versatile disc, a Blu-ray disc, and the like), a magnetic disk storage medium or another magnetic storage terminal device, or any other medium that can be configured to carry or store expected program code in a form of an instruction or a data structure and that can be accessed by a computer, but is not limited thereto. The memory 302 may exist independently, and is connected to the processor 301 through the communications bus 304. The memory 302 may be alternatively integrated with the processor 301.

The memory 302 is configured to store a software program for executing the solution of the present invention, and the execution is controlled by the processor 301.

The transceiver 303 is configured to communicate with another terminal device by using any terminal device such as a transceiver. Certainly, the transceiver 303 may be further configured to communicate with a communications network, such as an Ethernet, a radio access network (radio access network, RAN), or a wireless local area network (Wireless Local Area Networks, WLAN). The transceiver 303 may include a receiving unit for implementing a receiving function and a sending unit for implementing a sending function.

The communications bus 304 may be an industry standard architecture (industry Standard Architecture, ISA) bus, a peripheral terminal device interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 3, but this does not mean that there is only one bus or only one type of bus.

A structure of the terminal device shown in FIG. 3 does not constitute a limitation on the terminal device, and may include more or fewer parts than those shown in the figure, or combine some parts, or have different part arrangements.

In this embodiment of the present invention, the network device may notify the terminal device of configuration information by using higher layer signaling such as radio resource control (radio resource control, RRC) signaling. The terminal device may obtain the configuration information by receiving the higher layer signaling sent by the network device, where the configuration information includes at least two groups of different DRX parameters, and the terminal device may communicate with the network device on different BWPs by using different DRX parameters.

Figure 4:
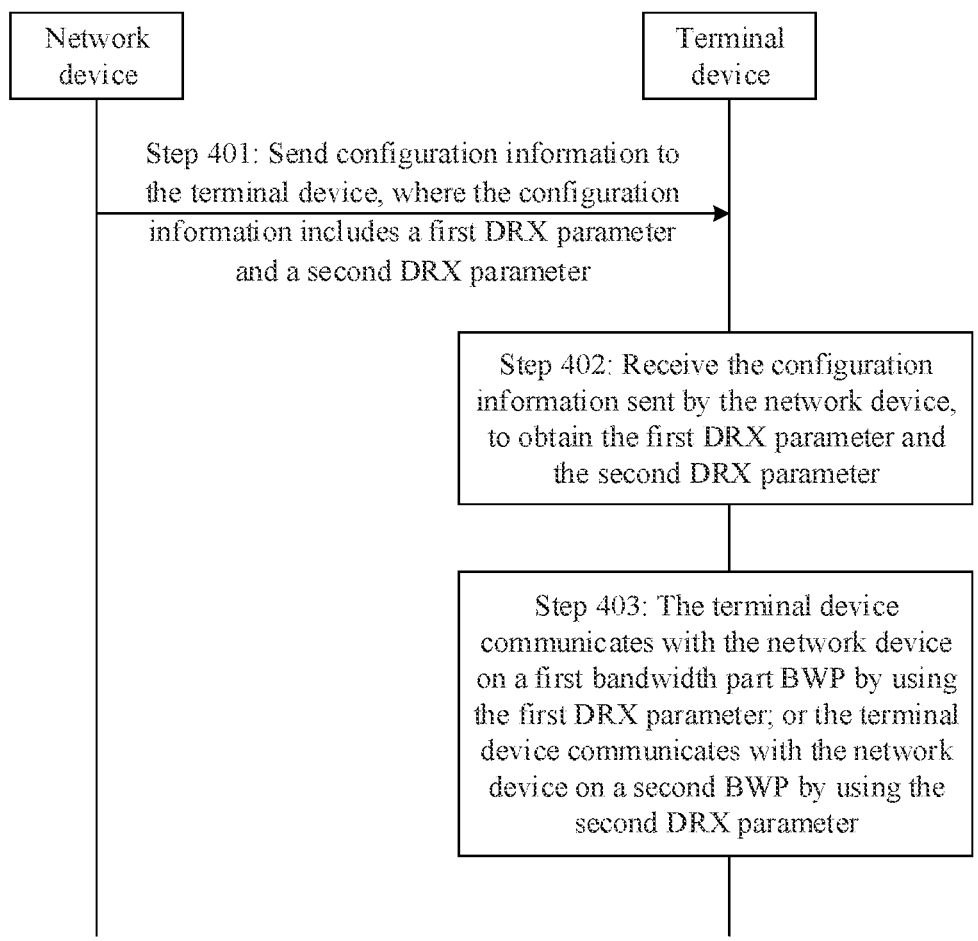
FIG. 4 is a schematic flowchart of a configuration method according to an embodiment of the present invention.

An embodiment of the present invention provides a configuration method. As shown in FIG. 4, the method includes the following steps.

Step 401: A network device sends configuration information to a terminal device, where the configuration information includes a first DRX parameter and a second DRX parameter.

In specific implementation, the network device may send the configuration information to the terminal device by using RRC signaling, for example, the configuration information is in the RRC signaling sent by the network device. In addition, the first DRX parameter and the second DRX parameter are different. In this embodiment of the present invention, the terminal device may configure a DRX function based on a DRX parameter, to reduce power consumption caused when the terminal device monitors a PDCCH on a BWP. The DRX parameter may include a plurality of parameters, such as a DRX cycle, duration of an active period, an inactivity timer, a downlink hybrid automatic repeat request (Hybrid Automatic Repeat Request, HARQ) backhaul time timer, an uplink HARQ backhaul time timer, a downlink retransmission timer, and an uplink retransmission timer. The duration of the active period is configured by a parameter drx-onDurationTimer. In addition, the inactivity timer is drx-InactivityTimer; the downlink HARQ backhaul time timer is drx-HARQ-RTT-TimerDL, and is used to indicate a shortest period of time after which specific HARQ process downlink retransmission first occurs; the uplink HARQ backhaul time timer is drx-HARQ-RTT-TimerUL, and is used to indicate a shortest period of time after which specific HARQ process downlink retransmission first occurs; the downlink retransmission timer is drx-RetransmissionTimerDL, and is used to limit maximum duration from start of the downlink retransmission timer to receiving one downlink retransmission by the terminal device; and the uplink retransmission timer is drx-RetransmissionTimerUL, and is used to limit maximum duration from start of the uplink retransmission timer to receiving of one uplink retransmission by the terminal device. In this embodiment of the present invention, that the first DRX parameter and the second DRX parameter are different may be that a parameter included in the first DRX parameter is completely different from a parameter included in the second DRX parameter, or that a parameter included in the first DRX parameter is partially the same as a parameter included in the second DRX parameter. This is not limited in this embodiment of the present invention.

In this embodiment of the present invention, the DRX parameter is not configured for each UE, but is configured for different BWPs. It may be considered that the BWP is associated with the DRX parameter. Generally, bandwidth of the different BWPs is different, and requirements of services carried on different bandwidth are different. The DRX parameter associated with the BWP may be configured based on requirements of services carried on different BWPs. For example, a length of the dormant period in the DRX cycle and a length of the dormant period in the DRX cycle are configured based on requirements of different services, to meet features of the different services. Alternatively, to avoid a problem that after being configured with the DRX function, the terminal device frequently witches BWPs because the dormant period in the DRX cycle is excessively long (for example, is greater than valid duration of a BWP timer), the network device may configure, based on a BWP type and the BWP timer, the DRX parameter associated with the BWP. For example, for a non-default BWP, a dormant period in a DRX parameter configured by the network device for the non-default BWP may be slightly shorter than the valid duration of the BWP timer. In this way, it can be ensured that BWP switching is not triggered when the terminal enters the dormant period after being configured with DRX. For a default BWP, the network device may configure a relatively long DRX dormant period for the default BWP, and because when the terminal device works on the default BWP, the terminal device does not switch to another BWP even if the BWP timer does not receive scheduling of the network device after the BWP timer expires, a relatively long DRX dormant period may be configured, to reduce power consumption caused when the terminal device monitors the PDCCH.

Specifically, a base station may configure the configuration information in the following four manners, including:

(1). The configuration information is information to be used by the network device to configure a BWP for the terminal device. In this embodiment of the present invention, the information may be referred to as BWP configuration information, the BWP configuration information includes a BWP configuration parameter, and the BWP configuration parameter includes a parameter used to configure the BWP, for example, a subcarrier spacing of the BWP, and bandwidth of the BWP. In an implementation of the configuration information, in addition to the parameter used to configure the BWP, the BWP configuration parameter further includes a DRX parameter associated with a BWP indicated by the BWP parameter. In other words, after receiving the information used to configure the BWP, the terminal device may obtain the BWP configuration parameter and the corresponding DRX parameter. When the terminal device communicates with the network device on the BWP indicated by the BWP configuration parameter, the terminal device may determine an active period and a dormant period in a DRX cycle based on the DRX parameter included in the BWP configuration parameter, and does not monitor on the PDCCH in the dormant period, thereby reducing power consumption of the terminal device.

In some embodiments, the configuration information received by the terminal device includes a configuration parameter of a first BWP and a configuration parameter of a second BWP. In addition to the parameter used to configure the BWP, the configuration parameter of the first BWP further includes the first DRX parameter. In addition to the parameter used to configure the BWP, the configuration parameter of the second BWP further includes the second DRX parameter.

(2). The configuration information is information to be used by the network device to configure DRX for the terminal device. In this embodiment of the present invention, the information may be referred to as DRX configuration information, and the DRX configuration information includes a parameter used to configure the DRX, such as a DRX cycle, duration of an active period, an inactivity timer, a downlink HARQ backhaul time timer, an uplink HARQ backhaul time timer, a downlink retransmission timer, or an uplink retransmission timer. In this embodiment of the present invention, in addition to the parameter used to configure the DRX, the DRX parameter may further include information about a BWP configured by the network device for the terminal device, such as a BWP identifier, where the BWP identifier may be an index (index). In other words, after receiving the DRX configuration information, the terminal device may obtain the DRX parameter and the corresponding BWP identifier. When the terminal device communicates with the network device on a BWP indicated by the identifier, the terminal device may determine an active period and a dormant period in a DRX cycle based on the DRX parameter, and does not monitor the PDCCH in the dormant period, thereby reducing power consumption of the terminal device.

In some embodiments, the configuration information received by the terminal device includes the first DRX parameter and the second DRX parameter. In addition to the parameter used to configure the DRX, the first DRX parameter further includes at least one BWP identifier. Similarly, in addition to the parameter used to configure the DRX, the second DRX parameter further includes at least one BWP identifier.

(3). The configuration information is BWP configuration information, the BWP configuration information includes a BWP configuration parameter, and the BWP configuration parameter includes a parameter used to configure a BWP. In this embodiment of the present invention, in addition to the parameter used to configure the BWP, the BWP configuration parameter further includes an identifier of a group of DRX parameters associated with the BWP, namely, a "DRX parameter identifier" described in this embodiment of the present invention. In other words, after receiving the BWP configuration information, the terminal device may obtain the BWP configuration parameter and the corresponding DRX parameter identifier. When the terminal device communicates with the network device on a BWP indicated by the BWP configuration parameter, the terminal device may determine a group of DRX parameters based on the DRX parameter identifier. Further, the terminal device may determine an active period and a dormant period in a DRX cycle based on the determined DRX parameter, and does not monitor the PDCCH in the dormant period, thereby reducing power consumption of the terminal device.

In some embodiments, the configuration information received by the terminal device includes a first BWP parameter and a second BWP parameter. In addition to the configuration parameter used to configure the BWP, the first BWP parameter further includes at least one DRX parameter identifier. In addition to the configuration parameter used to configure the BWP, the second BWP parameter further includes at least one DRX parameter identifier.

(4). The configuration information is DRX configuration information of the network device, and the DRX configuration information includes a parameter used to configure DRX. In this embodiment of the present invention, in addition to the parameter used to configure the DRX, the DRX parameter may further include information about a BWP configured by the network device for the terminal device, such as BWP type information. A BWP type may be a non-default BWP or a default BWP. Bandwidth of the non-default BWP and bandwidth of the default BWP are different. In some embodiments, the bandwidth of the default BWP means that, after receiving the DRX configuration information, the terminal device may obtain the DRX parameter and the corresponding BWP type information. When the terminal device communicates with the network device on a BWP indicated by the type information, the terminal device may determine an active period and a dormant period in a DRX cycle based on the DRX parameter, and does not monitor the PDCCH in the dormant period, thereby reducing power consumption of the terminal device.

In some embodiments, in addition to the parameter used to configure the DRX, the first DRX parameter further includes at least one piece of type information, and in addition to the parameter used to configure the DRX, the second DRX parameter includes at least one piece of type information. The type information is used to indicate a first type of BWP or a second type of BWP. In specific implementation, the first type of BWP is different from the second type of BWP. In some embodiments, bandwidth of the first type of BWP is less than bandwidth of the second type of BWP, the first type of BWP may be the default BWP, and the second type of BWP may be the non-default BWP.

It should be noted that the configuration information may alternatively include more than two DRX parameters. Similarly, after receiving the configuration information, the terminal device may communicate with the terminal device on different BWPs based on different DRX parameters. For example, the configuration information includes a DRX parameter 1, a DRX parameter 2, and a DRX parameter 3. After the terminal device receives the configuration information sent by the network device, the terminal device may communicate with the network device on a BWP 1 based on the DRX parameter 1, or the terminal device may communicate with the network device on a BWP 2 based on the DRX parameter 2, or the terminal device may communicate with the network device on a BWP 3 based on the DRX parameter 3.

Step 402: The terminal device receives the configuration information sent by the network device, and obtains the first DRX parameter and the second DRX parameter.

Corresponding to the four implementations of the configuration information in step 401, the terminal device may obtain the first DRX parameter and the second DRX parameter in the following four implementations, including:

(1). The configuration information is the BWP configuration information, the BWP configuration information includes the BWP configuration parameter, and the BWP configuration parameter includes the parameter used to configure the BWP and the DRX parameter. After receiving the BWP configuration information, the terminal device may obtain the BWP configuration parameter from the BWP configuration information, and therefore may obtain the corresponding DRX parameter.

In some embodiments, after receiving the configuration information sent by the network device, the terminal device may obtain the configuration parameter of the first BWP from the configuration information, and may further obtain the first DRX parameter from the configuration parameter of the first BWP. Certainly, the terminal device may also obtain the configuration parameter of the second BWP from the configuration information, and further obtain the second DRX parameter from the configuration parameter of the second BWP.

(2). The configuration information is the DRX configuration information, the DRX configuration information includes the DRX parameter, and the DRX parameter includes the parameter used to configure the DRX and at least one BWP identifier. After receiving the DRX configuration information, the terminal device may obtain the DRX parameter from the DRX configuration information, and therefore may obtain the BWP identifier in the DRX parameter.

In some embodiments, after receiving the configuration information sent by the network device, the terminal device may obtain the first DRX parameter from the configuration information, and may further obtain the BWP identifier from the first DRX parameter. Certainly, the terminal device may also obtain the second DRX parameter from the configuration information, and may further obtain the BWP identifier from the second DRX parameter.

In addition, the terminal device may further determine the first BWP based on the BWP identifier obtained from the first DRX parameter. When the terminal device works on the first BWP, the terminal device communicates with the network device by using the first DRX parameter. Certainly, the terminal device may also determine the second BWP based on the BWP identifier obtained from the second DRX parameter. When the terminal device works on the second BWP, the terminal device communicates with the network device by using the second DRX parameter.

It should be noted that the terminal device may obtain a plurality of BWP identifiers from the DRX parameter, and the plurality of BWP identifiers may correspond to a plurality of BWPs. The terminal device may determine, according to an instruction of the base station, a specific BWP that is in the plurality of BWPs and on which the terminal device finally works, or the terminal device may determine, based on a specific rule, a specific BWP on which the terminal device finally works, for example, the terminal device falls back to the default BWP after the BWP timer expires.

(3). The configuration information is the BWP configuration information, the BWP configuration information includes the BWP configuration parameter, and the BWP configuration parameter includes the parameter used to configure the BWP and the DRX parameter identifier. After receiving the BWP configuration information, the terminal device may obtain the BWP configuration parameter from the BWP configuration information, and therefore may obtain the corresponding DRX parameter identifier in the BWP configuration parameter.

In this embodiment of the present invention, the terminal device obtains the configuration parameter of the first BWP from the configuration information, obtains the DRX parameter identifier from the configuration parameter of the first BWP, and determines, as the first DRX parameter, a DRX parameter indicated by the DRX parameter identifier. Alternatively, the terminal device obtains the configuration parameter of the second BWP from the configuration information, obtains the DRX parameter identifier from the configuration parameter of the second BWP, and determines, as the second DRX parameter, a DRX parameter indicated by the DRX parameter identifier.

(4). The configuration information is the DRX configuration information, the DRX configuration information includes the DRX parameter, and the DRX parameter includes the parameter used to configure the DRX and the type information used to indicate the BWP type. After receiving the DRX configuration information, the terminal device may obtain the DRX parameter from the DRX configuration information, and therefore may obtain the type information in the DRX parameter.

In this embodiment of the present invention, the terminal device may obtain the first DRX parameter from the configuration information, obtain one piece of type information from the first DRX parameter, and determine, as the first BWP, a BWP indicated by the type information; and obtain the second DRX parameter from the configuration information, obtain one piece of type information from the second DRX parameter, and determine, as the second BWP, a BWP indicated by the type information.

Step 403: The terminal device communicates with the network device on the first bandwidth part BWP by using the first DRX parameter, or the terminal device communicates with the network device on the second BWP by using the second DRX parameter.

In specific implementation, the first BWP and the second BWP are different. For example, bandwidth of the first BWP and bandwidth of the second BWP are different, or a type of the first BWP and a type of the second BWP are different, for example, the first BWP is the non-default BWP, and the second BWP is the default BWP. It should be noted that the parameter used to configure the BWP may be, for example, bandwidth, a subcarrier spacing, a frequency domain location, or a BWP index value (index). In this embodiment of the present invention, any two BWPs may be considered as different BWPs if the two BWPs are different in terms of any parameter. For example, if bandwidth of any two BWPs is different, or subcarrier spacings are different, or frequency domain locations are different, or BWP index values (index) are different, the two BWPs may be considered as different BWPs.

In addition, BWPs may be classified into a downlink BWP (downlink BWP, DL BWP) and an uplink BWP (uplink BWP, UL BWP). The network device may configure a plurality of DL BWPs and a plurality of UL BWPs for the terminal device, and activate at least one DL BWP and at least one UL BWP. The terminal device receives, on the activated DL BWP, a downlink signal sent by the base station, and the downlink signal includes but is not limited to downlink control signaling and downlink data. UE sends an uplink signal on the activated UL BWP, and the uplink signal includes but is not limited to uplink control signaling, uplink data, an SR (scheduling request, scheduling request), an SRS (sounding reference signal, sounding reference signal), a channel state indicator (Channel State Indicator, CSI), channel quality indicator (Channel Quality Indicator, CQI) feedback, and the like. The first BWP in this embodiment of the present invention may be a downlink BWP, or may be an uplink BWP. Similarly, the second BWP may be a downlink BWP, or may be an uplink BWP.

In addition, if the configuration information sent by the network device in step 401 is the BWP configuration information, the BWP configuration information includes the BWP configuration parameter. The terminal device may determine, based on the parameter that is in the BWP configuration parameter and that is used to configure the BWP, a BWP (to be specific, an activated BWP) on which the terminal device works, and the terminal device may further configure a DRX function based on the DRX parameter in the BWP configuration parameter, or determine a group of DRX parameters based on the DRX parameter identifier in the BWP configuration parameter, and configure a DRX function based on the determined DRX parameter. It should be noted that the BWP configuration parameter may be a center frequency, bandwidth, or the like of the BWP, and the terminal device may determine, based on the BWP configuration parameter, the BWP on which the terminal device works.

If the configuration information sent by the network device in step 401 is the DRX configuration information, the DRX configuration information includes the DRX parameter. The terminal device may configure the DRX function based on the parameter that is in the DRX parameter and that is used to configure the DRX, and the terminal device may further determine, based on the BWP identifier included in the DRX parameter, a BWP on which the terminal device works, or determine, based on the BWP type information included in the DRX parameter, a BWP on which the terminal device works. It should be noted that the network device allocates a plurality of BWPs to the terminal device in advance, and determines an identifier of each BWP. Therefore, the terminal device may determine, based on the BWP identifier indicated by the network device by using the configuration information, the BWP on which the terminal device works. In some embodiments, the network device allocates a plurality of BWPs to the terminal device in advance, determines a type of each BWP, and may indicate a BWP type by using type information. For example, the type information includes a first type and a second type, the first type is the default BWP, and the second type is the non-default BWP.

An implementation of the configuration information is described in detail below with reference to standard language.

First, the network device may configure a plurality of groups of DRX parameters for the terminal device. When the terminal device works on different BWPs, different DRX parameters are used. The DRX parameter is configured for the terminal device in BWP configuration. Specifically, the DRX parameter such as drx-Config is added to a parameter BWP-Downlink Common and/or a parameter BWP-Downlink Dedicated. If the network device configures the DRX parameter for the terminal device in specific BWP configuration, when the terminal device works on this BWP, the network device needs to perform a DRX-related operation based on drx-Config in a parameter BWP-Downlink Common or a parameter BWP-Downlink Dedicated of the BWP, for example, monitor a PDCCH in an active period, and does not monitor a PDCCH in a dormant period.

It should be noted that BWP-Downlink Common and BWP-Downlink Dedicated further include another parameter. This is not limited in this embodiment of the present invention.

Second, the network device configures a plurality of groups of DRX parameters for the terminal device, and each group of DRX parameters is related to at least one BWP.

Specifically, a parameter drx-Config To Add Mod List is added to MAC-Cell Group Config, and a plurality of groups of DRX parameters are configured. In addition, a BWP identifier, such as a parameter Associated BWP-Id, is added to the DRX parameter to indicate a BWP associated with the DRX.

Third, the network device configures a plurality of groups of DRX parameters for the terminal device, and each group of DRX parameters is related to at least one BWP. The plurality of groups of DRX parameters may form a list, and each DRX parameter has an ID in the list.

Specifically, a parameter drx-Config To Add Mod List is added to MAC-Cell Group Config, a plurality of groups of DRX parameters are configured, and each DRX parameter has an ID. In addition, in BWP configuration, a parameter Associated DRX-Id is added to indicate an ID of a DRX parameter associated with this BWP.

In the conventional technology, only one group of DRX parameters is configured for each terminal device. In this embodiment of the present invention, a plurality of groups of DRX parameters are provided. Therefore, in this embodiment of the present invention, the DRX parameter identifier, such as DRX-Id, is further defined. The DRX-Id is an integer. In a possible implementation, a minimum value of the DRX-Id is 0, and a maximum value is a maximum quantity of DRX parameters supported by the terminal device.

Fourth, the network device configures a plurality of groups of DRX parameters for the terminal device, and each group of DRX parameters is related to at least one BWP.

Specifically, a parameter drx-Config To Add Mod List is added to MAC-Cell Group Config, and a plurality of groups of DRX parameters are configured. In addition, in DRX configuration, type information, such as a parameter Associated BWP-Type, is added to indicate a type of a BWP associated with the DRX parameter.

In some embodiments, Associated BWP-Type in the DRX parameter is used to indicate whether the BWP associated with the DRX parameter is the default BWP.

In some embodiments, a DRX dormant period for the default BWP is longer than a DRX dormant period for the non-default BWP. For example, the DRX dormant period for the non-default BWP is shorter than the valid duration of the BWP timer, so that the terminal device is prevented from jumping too quickly to the default BWP. The DRX dormant period for the default BWP is longer than the duration of the BWP timer, thereby reducing power consumption of the terminal device.

Figure 5:
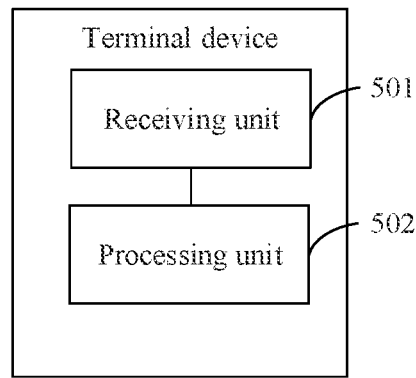
FIG. 5 is another structural block diagram of a terminal device according to an embodiment of the present invention.

An embodiment of the present invention provides a terminal device, and the terminal device may be a terminal device involved in the embodiments of the present invention, for example, the terminal device in the communications system shown in FIG. 1. When a functional module is obtained through division for each function, FIG. 5 is a possible schematic structural diagram of the terminal device. As shown in FIG. 5, the terminal device includes a receiving unit 501 and a processing unit 502.

The receiving unit 501 is configured to support the terminal device in performing a specific procedure of receiving the configuration information in step 402 in the foregoing embodiment and/or another process of the technology described in this specification.

The processing unit 502 is configured to support the terminal device in performing a specific procedure of obtaining the first DRX parameter and the second DRX parameter in step 402 in the foregoing embodiment and step 403 and/or another process of the technology described in this specification.

It should be noted that, for all related content of the steps involved in the foregoing method embodiment, refer to function descriptions of corresponding functional modules. Details are not described herein.

Figure 6:
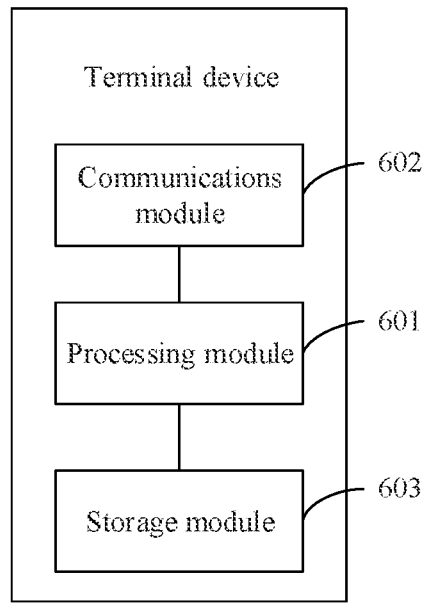
FIG. 6 is another structural block diagram of a terminal device according to an embodiment of the present invention.

For example, when an integrated unit is used, a schematic structural diagram of a terminal device provided in an embodiment of this application is shown in FIG. 6. In FIG. 6, the terminal device includes a processing module 601 and a communications module 602. The processing module 601 is configured to control and manage an action of the terminal device, for example, perform the step performed by the processing unit 502, and/or perform another process of the technology described in this specification. The communications module 602 is configured to support interaction between the terminal device and another device, for example, perform the step performed by the receiving unit 501. As shown in FIG. 6, the terminal device may further include a storage module 603, and the storage module 603 is configured to store program code and data of the terminal device.

When the processing module 601 is a processor, the communications module 602 is a transceiver, and the storage module 603 is a memory, the terminal device may be the terminal device shown in FIG. 3.

Figure 7:
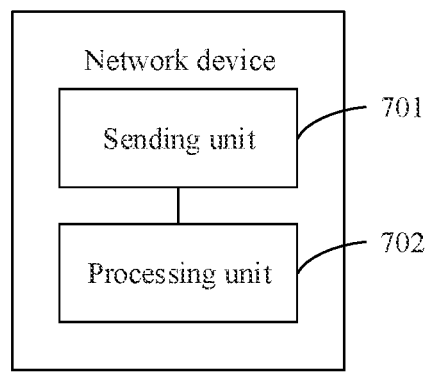
FIG. 7 is a structural block diagram of a network device according to an embodiment of the present invention.

When a functional module is obtained through division for each function, FIG. 7 is a possible schematic structural diagram of the network device involved in the foregoing embodiments. As shown in FIG. 7, the network device includes a sending unit 701 and a processing unit 702.

The sending unit 701 is configured to support the network device in performing step 401 in the foregoing embodiment and/or used in another process of the technology described in this specification.

The processing unit 702 is configured to support the network device in generating the configuration information sent in step 401 and/or used in another process of the technology described in this specification.

It should be noted that, for all related content of the steps involved in the foregoing method embodiment, refer to function descriptions of corresponding functional modules. Details are not described herein.

Figure 8:
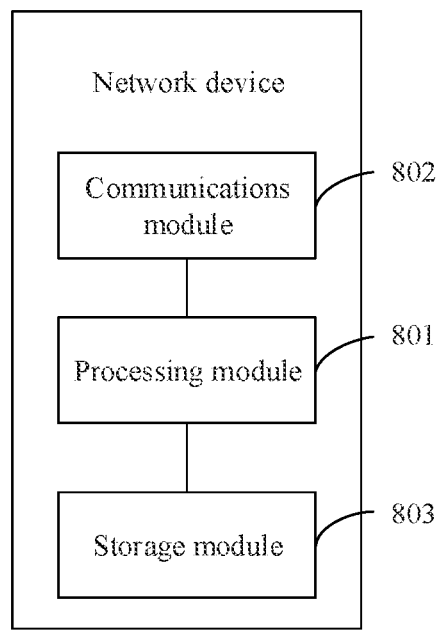
FIG. 8 is another structural block diagram of a network device according to an embodiment of the present invention.

For example, when an integrated unit is used, a schematic structural diagram of a network device provided in an embodiment of this application is shown in FIG. 8. In FIG. 8, the network device includes a processing module 801 and a communications module 802. The processing module 801 is configured to control and manage an action of the network device, for example, perform the step performed by the processing unit 702, and/or perform another process of the technology described in this specification. The communications module 802 is configured to support interaction between the network device and another device, for example, perform the step performed by the sending unit 701 and various interactions with the network device. As shown in FIG. 8, the network device may further include a storage module 803, and the storage module 803 is configured to store program code and data of the network device.

Figure 9:
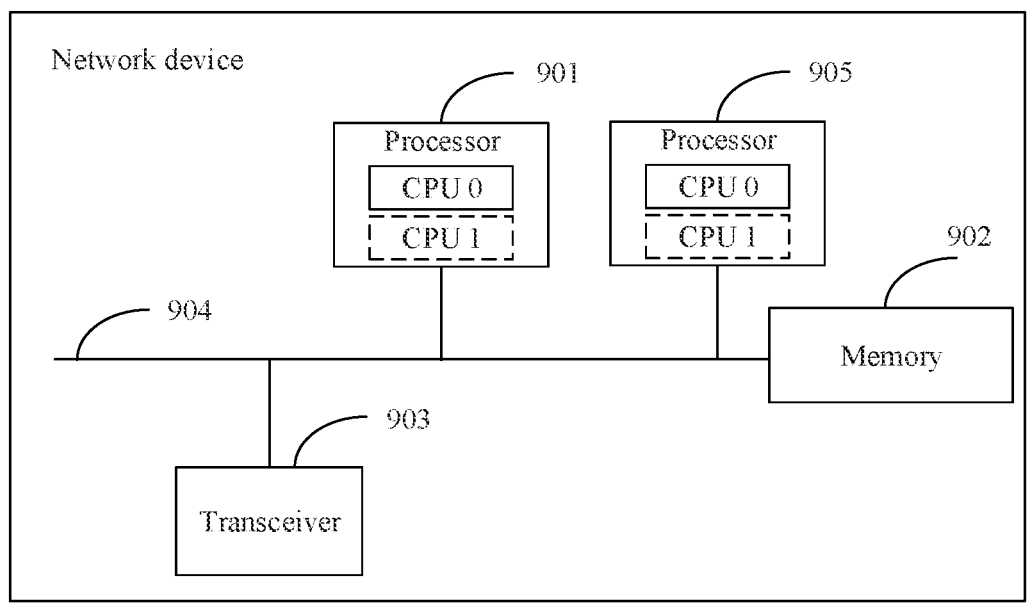
FIG. 9 is another structural block diagram of a network device according to an embodiment of the present invention.

When the processing module 801 is a processor, the communications module 802 is a transceiver, and the storage module 803 is a memory, the network device is a network device shown in FIG. 9. As shown in FIG. 9, the network device may include at least one processor 901, a memory 902, a transceiver 903, and a communications bus 904. The processor 901, the memory 902, and the transceiver 903 are connected by using the communications bus 904.

Each constituent part of the network device is specifically described below with reference to FIG. 9.

The processor 901 is a control center of the network device, and the processor 901 may perform various functions of the network device by running or executing a software program stored in the memory 902 and invoking data stored in the memory 902.

In specific implementation, in an embodiment, the processor 901 may include one or more CPUs, for example, a CPU 0 and a CPU 1 shown in FIG. 9.

The network device may include a plurality of processors, such as the processor 901 and a processor 905 shown in FIG. 9. Each of these processors may be a single-core (single-CPU) processor, or may be a multi-core (multi-CPU) processor. The processor herein may be one or more network devices, circuits, and/or processing cores used for processing data (for example, a computer program instruction).

The transceiver 903 is configured to communicate with another device by using any network device such as a transceiver, for example, communicate with the network device. Certainly, the transceiver 903 may be further configured to communicate with a communications network.

A structure of the network device shown in FIG. 9 does not constitute a limitation on the network device, and may include more or fewer parts than those shown in the figure, or combine some parts, or have different part arrangements.

An embodiment of the present invention further provides a computer-readable storage medium. The computer-readable storage medium stores an instruction, and when the computer-readable storage medium runs on the terminal devices shown in FIG. 5, FIG. 6, and FIG. 3, the terminal devices are enabled to perform the configuration method shown in FIG. 4.

An embodiment of the present invention further provides a computer-readable storage medium. The computer-readable storage medium stores an instruction, and when the computer-readable storage medium runs on the network devices shown in FIG. 7, FIG. 8, and FIG. 9, the network devices are enabled to perform the configuration method shown in FIG. 4.

An embodiment of the present invention further provides a wireless communications apparatus. The wireless communications apparatus stores an instruction, and when the wireless communications apparatus runs on the terminal devices shown in FIG. 5, FIG. 6, and FIG. 3, the wireless communications apparatus is enabled to perform the configuration method shown in FIG. 4. The wireless communications apparatus may be a chip.

An embodiment of the present invention further provides a wireless communications apparatus. The wireless communications apparatus stores an instruction, and when the wireless communications apparatus runs on the network devices shown in FIG. 7, FIG. 8, and FIG. 9, the wireless communications apparatus is enabled to perform the configuration method shown in FIG. 4. The wireless communications apparatus may be a chip.

The foregoing descriptions about implementations allow a person skilled in the art to clearly understand that, for the purpose of convenient and brief description, division of the foregoing functional modules is merely used as an example for illustration. During actual application, the foregoing functions can be allocated to different modules and implemented based on a requirement, in other words, an inner structure of a database access apparatus is divided into different functional modules to implement all or some of the functions described above.

In the several embodiments provided in this application, it should be understood that the disclosed database access apparatus and method may be implemented in other manners. For example, the described embodiment of the database access apparatus is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electronic, mechanical, or other forms.

The units described as separate parts may or may not be physically separate, and parts displayed as units may be one or more physical units, may be located on one location, or may be distributed on different locations. Some or all of the units may be selected based on actual requirements to achieve objectives of the solutions of the embodiments.

In addition, functional units in the embodiments of this application may be integrated into one processing unit, or each of the units may exist independently physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in a form of a software product. The software product is stored in a storage medium and includes several instructions for indicating a device (which may be a single-chip microcomputer, a chip, or the like) or a processor to perform all or some of the steps of the method described in each embodiment of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A configuration method implemented by a first device, wherein the configuration method comprises:
   receiving, from a second device, configuration information comprising a first discontinuous reception (DRX) parameter and a second DRX parameter, wherein the first DRX parameter comprises a first bandwidth part (BWP) identifier corresponding to a first BWP, and wherein the second DRX parameter comprises a second BWP identifier corresponding to a second BWP;
   obtaining the first DRX parameter from the configuration information;
   obtaining the first BWP identifier from the first DRX parameter;
   determining the first BWP based on the first BWP identifier;
   obtaining the second DRX parameter from the configuration information;
   obtaining the second BWP identifier from the second DRX parameter;
   determining the second BWP based on the second BWP identifier; and
   communicating with the second device either on the first BWP using the first DRX parameter or on the second BWP using the second DRX parameter.

2. The configuration method of claim 1, wherein the first DRX parameter indicates a duration of an active period.

3. The configuration method of claim 1, wherein the first DRX parameter indicates a first inactivity timer.

4. The configuration method of claim 1, wherein the first DRX parameter indicates a first downlink hybrid automatic repeat request (HARQ) backhaul time timer.

5. The configuration method of claim 1, wherein the first DRX parameter indicates a first uplink hybrid automatic repeat request (HARQ) backhaul time timer.

6. The configuration method of claim 1, wherein the first DRX parameter indicates a first downlink retransmission timer.

7. The configuration method of claim 1, wherein the first DRX parameter indicates a first downlink retransmission timer.

8. A configuration method implemented by a second device, wherein the configuration method comprises:
  generating configuration information comprising a first discontinuous reception (DRX) parameter and a second DRX parameter, wherein the first DRX parameter comprises a first bandwidth part (BWP) identifier corresponding to a first BWP, and wherein the second DRX parameter comprises a second BWP identifier corresponding to a second BWP;
  sending the configuration information to a first device to instruct the first device to communicate with the second device either on the first BWP using the first DRX parameter or on the second BWP using the second DRX parameter; and
  communicating with the first device either on the first BWP using the first DRX parameter or on the second BWP using the second DRX parameter.

9. The configuration method of claim 8, wherein the first DRX parameter indicates one or more of a first duration of a first active period, a first inactivity timer, a first downlink hybrid automatic repeat request (HARQ) backhaul time timer, a first uplink HARQ backhaul time timer, a first downlink retransmission timer, or a first uplink retransmission timer, and wherein the second DRX parameter indicates one or more of a second duration of a second active period that is different than the first duration, a second inactivity timer that is different than the first inactivity timer, a second downlink HARQ backhaul time timer that is different than the first downlink HARQ backhaul time timer, a second uplink HARQ backhaul time timer that is different than the first uplink HARQ backhaul time timer, a second downlink retransmission timer that is different than the first downlink retransmission timer, or a second uplink retransmission timer that is different than the first uplink retransmission timer.

10. The configuration method of claim 8, wherein the first DRX parameter comprises a first BWP identifier, and wherein the second DRX parameter comprises a second BWP identifier.

11. The configuration method of claim 8, wherein the configuration information further comprises a first configuration parameter of the first BWP and a second configuration parameter of the second BWP, wherein the first configuration parameter comprises a first DRX parameter identifier, and wherein the second configuration parameter comprises a second DRX parameter identifier.

12. The configuration method of claim 8, wherein the first DRX parameter further comprises a first piece of type information, wherein the second DRX parameter comprises a second piece of the type information, wherein the type information indicates a first type of BWP or a second type of BWP, and wherein the first type of BWP is different from the second type of BWP.

13. The configuration method of claim 8, wherein the second device is a network device, and wherein the first device is a terminal device or a chip configurable on the terminal device.

14. An apparatus comprising:
  a transceiver configured to receive, from a device, configuration information comprising a first discontinuous reception (DRX) parameter and a second DRX parameter, wherein the first DRX parameter comprises a first bandwidth part (BWP) identifier corresponding to a first BWP, and wherein the second DRX parameter comprises a second BWP identifier corresponding to a second BWP; and
  a processor coupled to the transceiver and configured to:
    obtain the first DRX parameter from the configuration information;
    obtain the first BWP identifier from the first DRX parameter;
    determine the first BWP based on the first BWP identifier;
    obtain the second DRX parameter from the configuration information;
    obtain the second BWP identifier from the second DRX parameter;
    determine the second BWP based on the second BWP identifier; and
    communicate, using the transceiver, with the device either on the first BWP using the first DRX parameter or on the second BWP using the second DRX parameter.

15. The apparatus of claim 14, wherein the first DRX parameter indicates a duration of an active period.

16. The apparatus of claim 14, wherein the first DRX parameter indicates a first inactivity timer.

17. The apparatus of claim 14, wherein the first DRX parameter indicates a first downlink retransmission timer.

18. The apparatus of claim 14, wherein the first DRX parameter indicates a first downlink hybrid automatic repeat request (HARQ) backhaul time timer.

19. The apparatus of claim 14, wherein the first DRX parameter indicates a first uplink hybrid automatic repeat request (HARQ) backhaul time timer.

20. The apparatus of claim 14, wherein the first DRX parameter indicates a first uplink retransmission timer.

* * * * *